United States Patent
Hwang et al.

(10) Patent No.: US 12,476,332 B2
(45) Date of Patent: Nov. 18, 2025

(54) CONNECTION MEMBER CONNECTED TO ELECTRODE LEADS BY PHYSICAL COUPLING AND BATTERY CELL STACK INCLUDING THE SAME

(71) Applicant: LG Energy Solution, Ltd., Seoul (KR)

(72) Inventors: Sung Tack Hwang, Daejeon (KR); Jin Woo Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 787 days.

(21) Appl. No.: 17/632,651

(22) PCT Filed: Sep. 3, 2020

(86) PCT No.: PCT/KR2020/011810
§ 371 (c)(1),
(2) Date: Feb. 3, 2022

(87) PCT Pub. No.: WO2021/071099
PCT Pub. Date: Apr. 15, 2021

(65) Prior Publication Data
US 2022/0278428 A1 Sep. 1, 2022

(30) Foreign Application Priority Data
Oct. 8, 2019 (KR) .......... 10-2019-0124560

(51) Int. Cl.
*H01M 50/517* (2021.01)
*H01R 4/48* (2006.01)

(52) U.S. Cl.
CPC .......... *H01M 50/517* (2021.01); *H01R 4/48* (2013.01)

(58) Field of Classification Search
CPC ..... H01M 50/502–509; H01M 50/514; H01M 50/517; H01M 50/531; H01M 50/533;
(Continued)

(56) References Cited

U.S. PATENT DOCUMENTS

2007/0207377 A1* 9/2007 Han .................. H01M 50/507
429/185
2015/0125727 A1 5/2015 Lui et al.
(Continued)

FOREIGN PATENT DOCUMENTS

CN 205882078 U 1/2017
CN 109244288 A 1/2019
(Continued)

OTHER PUBLICATIONS

Extended European Search Report including Written Opinion for Application No. 20873558.9 dated Aug. 1, 2023, pp. 1-9.
(Continued)

*Primary Examiner* — Keith Walker
*Assistant Examiner* — Steven S Ha
(74) *Attorney, Agent, or Firm* — Lerner David LLP

(57) ABSTRACT

Disclosed are a connection member configured to perform electrical connection between electrode leads, wherein the connection member includes a pair of a first connection member and a second connection member, one of the first connection member and the second connection member is provided with a fixing portion configured to perform connection therebetween, the other of the first connection member and the second connection member is provided with a catching portion configured to allow the fixing portion to be fastened thereto, the electrode leads are physically coupled to each other without welding, and a process of excessively bending the electrode leads so as to be coupled to bus bars is omitted, whereby it is possible to improve safety of the electrode leads, and a battery cell stack including the same.

10 Claims, 8 Drawing Sheets

(58) Field of Classification Search
CPC .. H01M 50/534; H01M 50/536; H01M 50/54; H01R 4/48
See application file for complete search history.

(56) References Cited

U.S. PATENT DOCUMENTS

| | | |
|---|---|---|
| 2019/0006652 A1 | 1/2019 | Kim |
| 2019/0006653 A1 | 1/2019 | Shimoda et al. |
| 2019/0386281 A1 | 12/2019 | Jeon et al. |
| 2020/0020915 A1 | 1/2020 | Chi et al. |
| 2020/0099034 A1 | 3/2020 | Jin et al. |
| 2020/0303710 A1* | 9/2020 | Jung .................. F16B 35/00 |
| 2020/0350547 A1 | 11/2020 | Chi et al. |
| 2020/0381691 A1 | 12/2020 | Chi et al. |
| 2021/0157196 A1 | 5/2021 | Kim et al. |

FOREIGN PATENT DOCUMENTS

| | | |
|---|---|---|
| CN | 110073520 A | 7/2019 |
| CN | 110168770 A | 8/2019 |
| JP | 2004055348 A | 2/2004 |
| JP | 2006172891 A | 6/2006 |
| JP | 2013206844 A | 10/2013 |
| JP | 2014022256 A | 2/2014 |
| JP | 2014110219 A | 6/2014 |
| KR | 20140091102 A | 7/2014 |
| KR | 20170087084 A | 7/2017 |
| KR | 20180065234 A | 6/2018 |
| KR | 20180127760 A | 11/2018 |
| KR | 20190040759 A | 4/2019 |
| KR | 20190051157 A | 5/2019 |
| KR | 20190107396 A | 9/2019 |
| KR | 20190124560 A | 11/2019 |
| WO | 2006046585 A1 | 5/2006 |
| WO | WO-2018186594 A1 * | 10/2018 ............. F16B 35/00 |
| WO | 2018216872 A1 | 11/2018 |
| WO | 2019074206 A1 | 4/2019 |

OTHER PUBLICATIONS

International Search Report for PCT/KR2020/011810 dated Dec. 4, 2020. 3pgs.

* cited by examiner

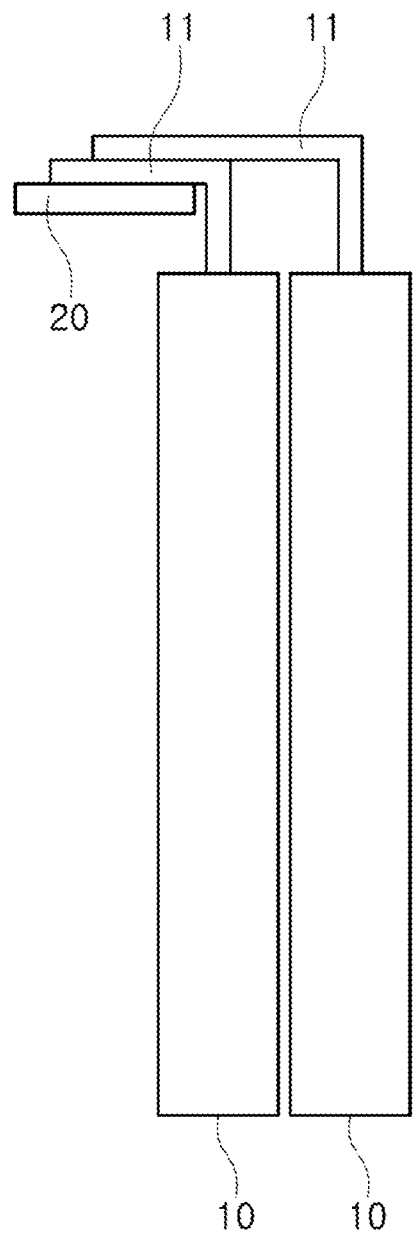
[FIG. 1]

[FIG. 2]
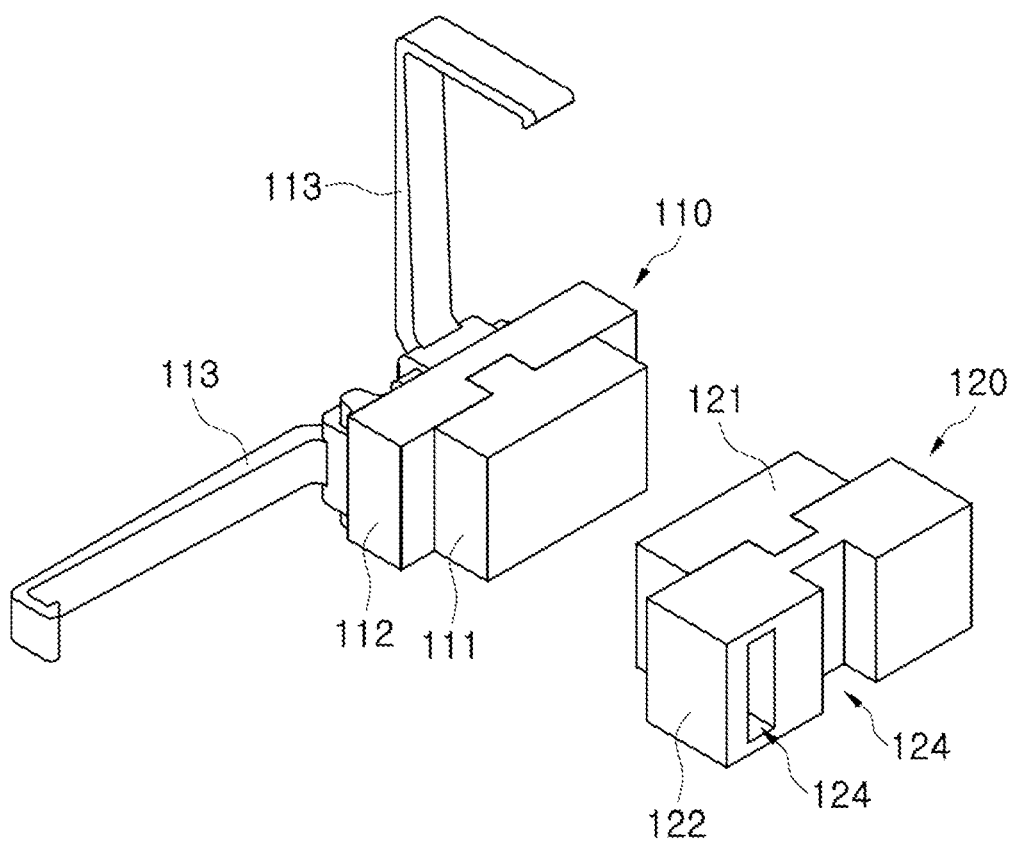

[FIG. 3]
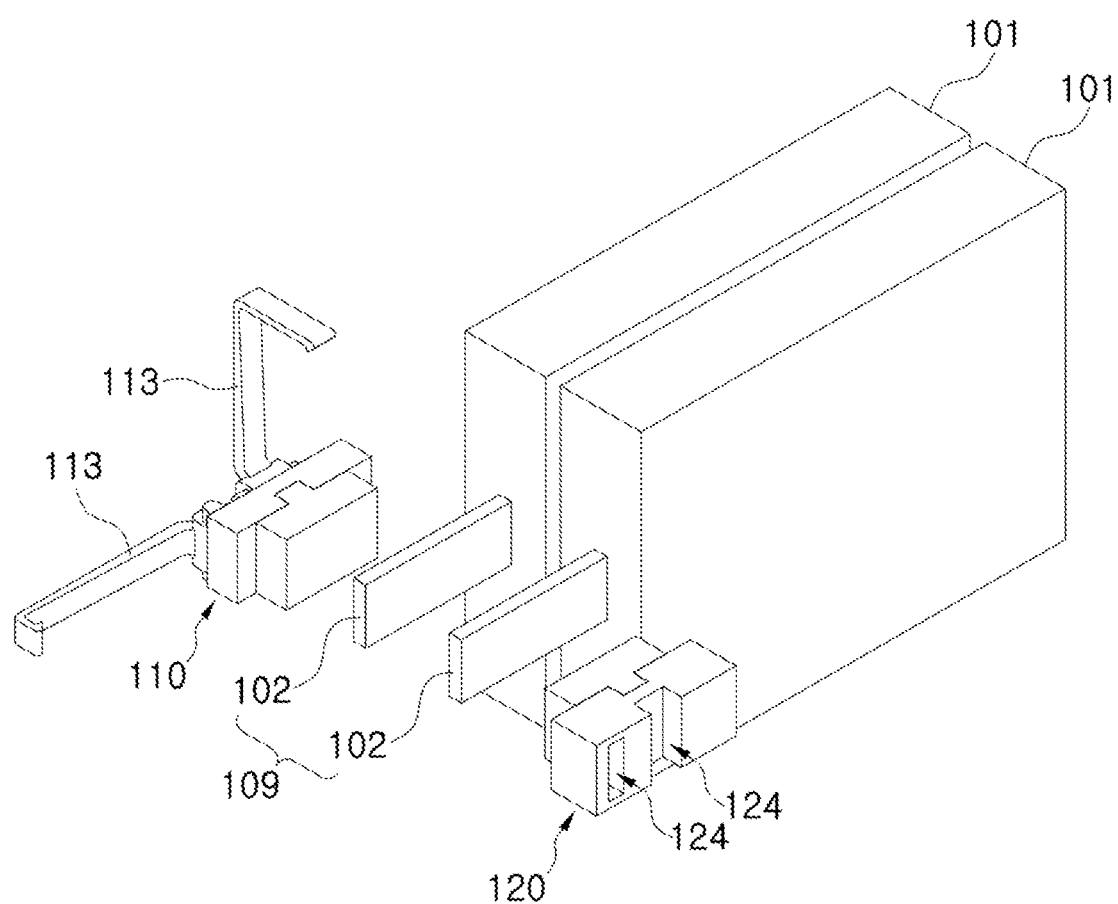

[FIG. 4]
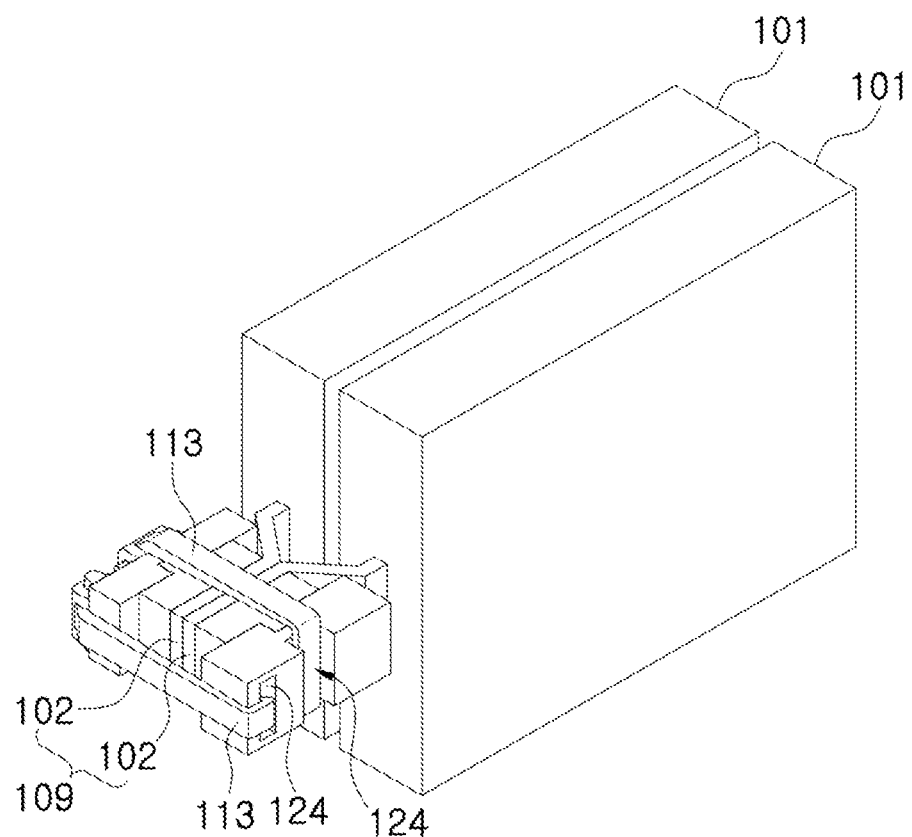

[FIG. 5]
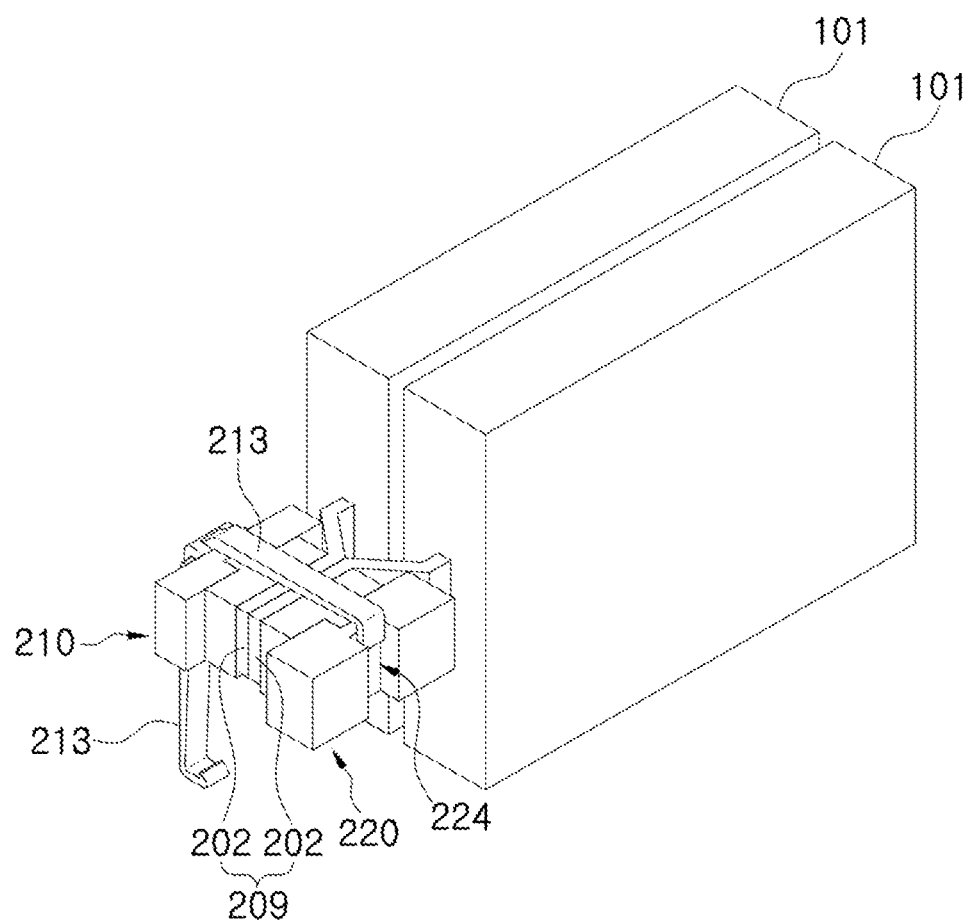

[FIG. 6]
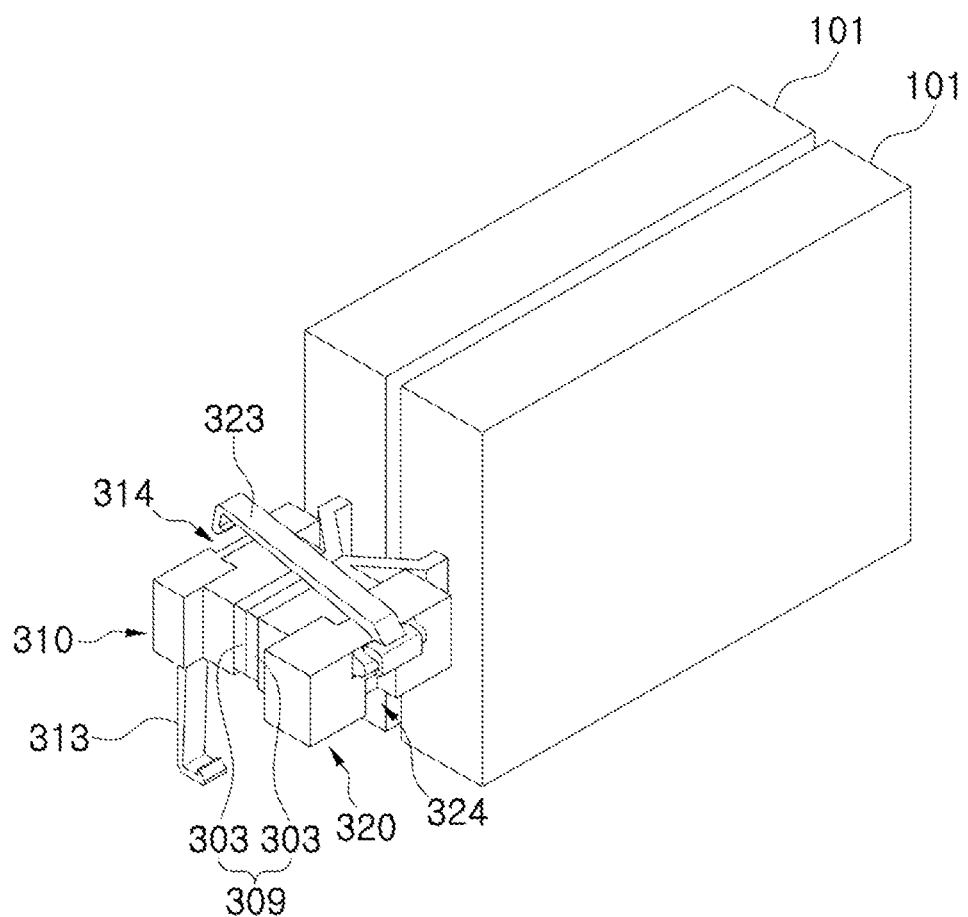

[FIG. 7]
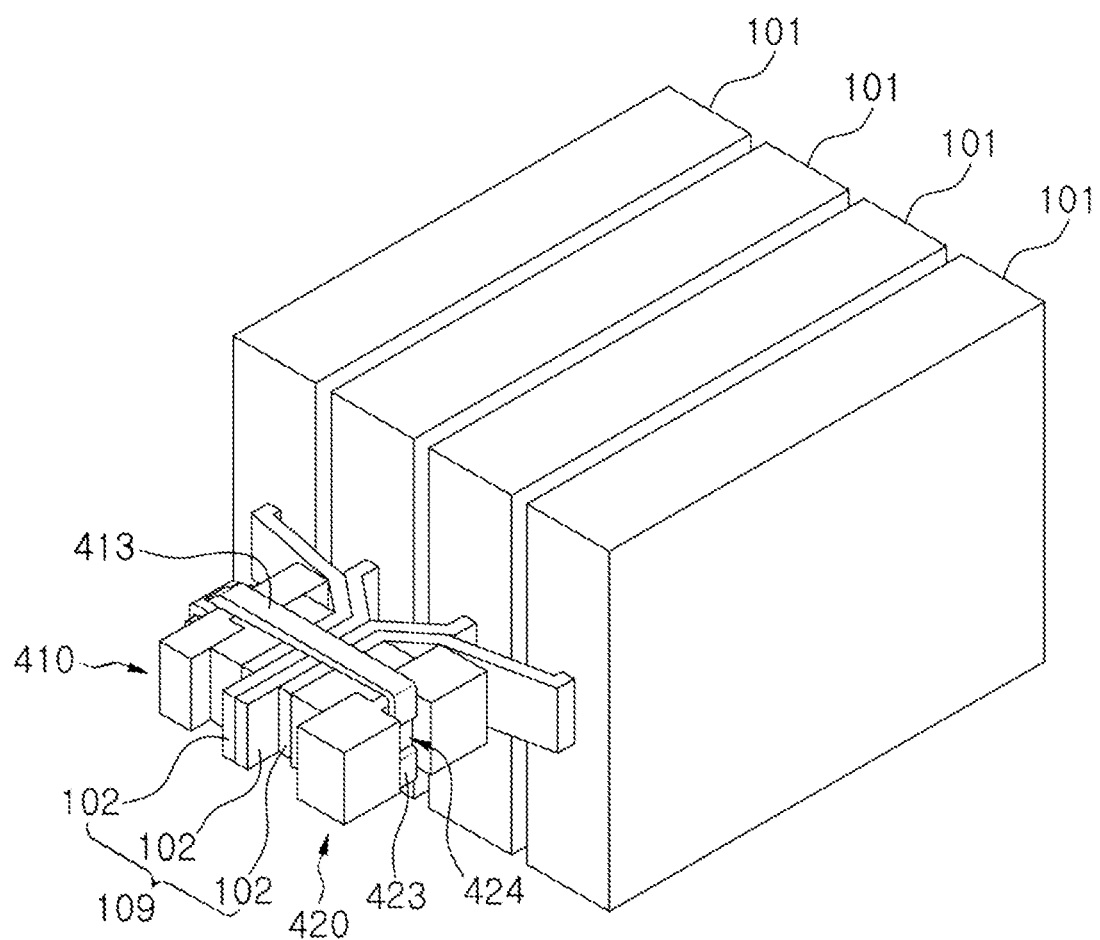

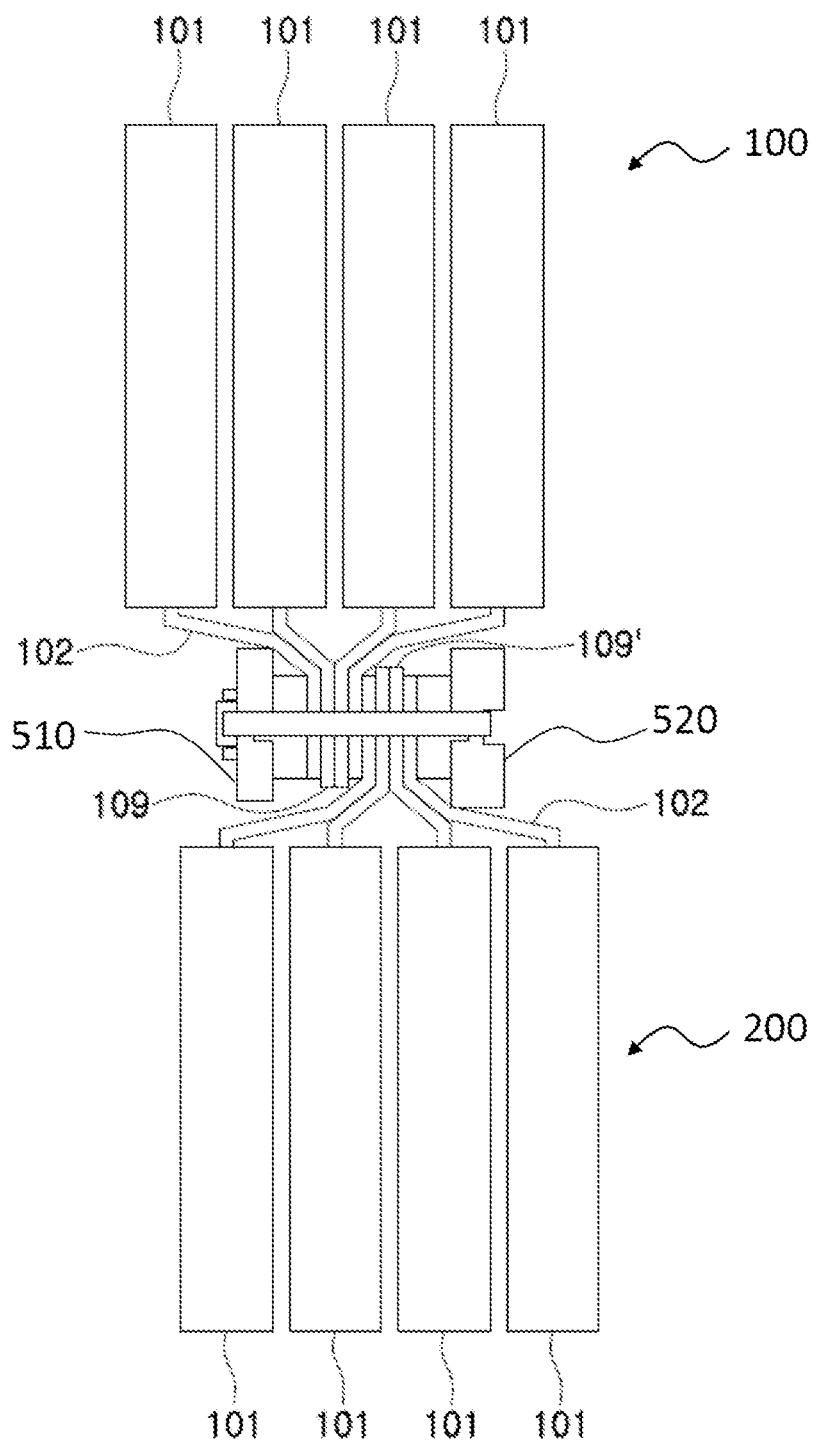
[FIG. 8]

CONNECTION MEMBER CONNECTED TO ELECTRODE LEADS BY PHYSICAL COUPLING AND BATTERY CELL STACK INCLUDING THE SAME

CROSS-REFERENCE TO RELATED APPLICATIONS

This application is a national stage entry under 35 U.S.C. § 371 of International Patent Application No. PCT/KR2020/011810, filed on Sep. 3, 2020, published in Korean, which claims priority to Korean Patent Application No. 10-2019-0124560 filed on Oct. 8, 2019, the entire contents of which are hereby incorporated by reference herein.

TECHNICAL FIELD

The present invention relates to a connection member connected to electrode leads by physical coupling and a battery cell stack including the same, and more particularly to a connection member including a pair of a first connection member and a second connection member arranged in tight contact with outer surfaces of electrode leads in order to perform electrical connection therebetween and a battery cell stack including the same.

BACKGROUND ART

A secondary battery is widely used in medium- or large-sized devices, such as vehicles or power storage apparatuses, as well as small-sized devices, such as portable electronic devices. In the case in which the secondary battery is used in medium- or large-sized devices, a plurality of secondary batteries is electrically connected to each other to constitute a battery module or a battery pack in order to increase the capacity and output thereof.

Electrode leads are connected to each other such that the secondary batteries are electrically connected to each other in the battery module, and the connection portion therebetween may be welded in order to maintain the state in which the electrode leads are connected to each other. To this end, one end of each of the electrode leads may be fixed to a bus bar, configured to perform electrical connection between the secondary batteries, in contact therewith by welding, etc.

In connection therewith, FIG. 1 is a front view showing a general coupling state between electrode leads and a bus bar.

Referring to FIG. 1, two battery cells 10 are arranged in tight contact, each of the battery cells 10 is provided with an electrode lead 11, which protrudes upwards therefrom, and the electrode leads 11 are bent by 90 degrees and attached to the outer surface of one side of a single bus bar 20. In such a bending process, the electrode leads may be damaged.

The bent electrode leads 11 are coupled to the outer surface of one side of the bus bar 20 at the portions thereof that overlap the outer surface thereof by welding, and the electrode leads are damaged by heat generated during the welding process.

In connection therewith, Patent Document 1 discloses a bus bar assembly having a structure in which electrode leads are coupled to a bus bar while the electrode leads are not bent such that the electrode leads can be brought into tight contact with the bus bar and a battery module including the same. However, ends of the electrode leads of Patent Document 1 are clamped by the bus bar assembly and are then coupled to each other by welding. As a result, a problem in that the electrode leads are damaged by welding heat has yet to be resolved.

Therefore, there is a high need to solve a problem in that, in a process of coupling electrode leads to a bus bar in order to connect a plurality of battery cells to each other, the electrode leads are damaged.

PRIOR ART DOCUMENT (Patent Document 1) Korean Patent Application Publication No. 2019-0051157 (2019 May 15)

DISCLOSURE

Technical Problem

The present invention has been made in view of the above problems, and it is an object of the present invention to provide a connection member connected to electrode leads while deforming the electrode leads such that the electrode leads are brought into physical contact with each other without welding and a battery cell stack including the same.

Technical Solution

In order to accomplish the above objects, a connection member according to the present invention, which is a connection member configured to perform electrical connection between electrode leads, is configured to have a structure in which the connection member includes a pair of a first connection member and a second connection member, one of the first connection member and the second connection member is provided with a fixing portion configured to perform connection therebetween, and the other of the first connection member and the second connection member is provided with a catching portion configured to allow the fixing portion to be fastened thereto.

Each of the first connection member and the second connection member may include a bus bar configured to perform electrical connection and a plate configured to fix the bus bar, and the fixing portion and the catching portion may be formed at the plates.

Each of the plates including the fixing portion and the catching portion may be made of an insulating material.

The fixing portion and the catching portion may be formed so as to constitute a coupling pair, and two or more coupling pairs may be provided.

In a concrete example, two fixing portions may be formed at the first connection member, and two catching portions may be formed at the second connection member.

Alternatively, a fixing portion and a catching portion may be formed at each of the first connection member and the second connection member, the fixing portion of the first connection member may be fastened to the catching portion of the second connection member, and the fixing portion of the second connection member may be fastened to the catching portion of the first connection member.

At least a part of the fixing portion may be made of an elastic material.

At least a part of the plate may be made of an elastic material.

The present invention provides a battery cell stack having electrical connection performed by the connection member, wherein the battery cell stack is constituted by two or more battery cells, the battery cells are arranged in tight contact in the state in which coupling surfaces of electrode leads of the battery cells are disposed so as to face each other, and the coupling surfaces of the electrode leads are brought into tight contact with each other by fastening of the connection member.

The electrode leads may be arranged in tight contact to form an electrode lead bundle, and the outermost electrode leads of the electrode lead bundle may be brought into tight contact with a bus bar of the first connection member and a bus bar of the second connection member, respectively, whereby electric connection therebetween is performed.

The battery cell stack may include a first battery cell stack and a second battery cell stack, the first battery cell stack may include a first electrode lead bundle, the second battery cell stack may include a second electrode lead bundle, the first battery cell stack and the second battery cell stack may be disposed so as to face each other in the state in which the first electrode lead bundle and the second electrode lead bundle are located adjacent to each other, and coupling surfaces of the first electrode lead bundle of the first battery cell stack and the second electrode lead bundle of the second battery cell stack may be coupled so as to be brought into tight contact with each other by the first connection member and the second connection member.

In addition, the present invention provides a battery pack including the battery cell stack.

In addition, the present invention provides a device that uses the battery pack as an energy source. The device may be an electric vehicle, a hybrid electric vehicle, a power storage apparatus, an electric bicycle, or an electric wheelchair.

DESCRIPTION OF DRAWINGS

FIG. 1 is a front view showing a general coupling state between electrode leads and a bus bar.

FIG. 2 is a perspective view of a connection member according to a first embodiment.

FIG. 3 is a perspective view showing the process in which the connection member of FIG. 2 is coupled to a battery cell stack.

FIG. 4 is a perspective view showing the state in which the connection member of FIG. 3 is coupled to electrode leads.

FIG. 5 is a perspective view showing the state in which a connection member according to a second embodiment is connected to a battery cell stack.

FIG. 6 is a perspective view showing the state in which a connection member according to a third embodiment is connected to a battery cell stack.

FIG. 7 is a perspective view showing the state in which a connection member according to a fourth embodiment is connected to a battery cell stack.

FIG. 8 is a plan view showing the state in which two battery cell stacks, one of which is shown in FIG. 7, are connected to each other.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

A description to embody elements through limitation or addition may be applied to all inventions, unless particularly restricted, and does not limit a specific invention.

Hereinafter, embodiments of the present invention will be described in detail with reference to the accompanying drawings.

FIG. 2 is a perspective view of a connection member according to a first embodiment.

Referring to FIG. 2, the connection member is constituted by a first connection member 110 and a second connection member 120, the first connection member 110 includes a bus bar 111 configured to perform electrical connection and a plate 112 configured to fix the bus bar 111, and the second connection member 120 includes a bus bar 121 configured to perform electrical connection and a plate 122 configured to fix the bus bar 121.

In the connection member according to the present invention, one of the first connection member and the second connection member is provided with a fixing portion configured to perform connection therebetween, and the other of the first connection member and the second connection member is provided with a catching portion configured to allow the fixing portion to be fastened thereto. The fixing portion and the catching portion are formed in equal numbers so as to form a coupling pair.

Meanwhile, the fixing portion and the catching portion are formed at the plates, and each of the plates is made of an insulating material. Specifically, each of the fixing portion and the catching portion is also made of an insulating material.

Consequently, only the bus bars, which are connected to electrode leads, are made of an electrically conductive material, and electrical connection between the remaining components of the connection member, i.e. the fixing portion and the catching portion, including the plates, is interrupted.

In order to maintain coupling between the first connection member and the second connection member, it is preferable that two or more coupling pairs of fixing portions and catching portions be provided. The connection member of FIG. 2 has two coupling pairs.

That is, two fixing portions 113 are formed at the first connection member 110, and two catching portions 124 configured to receive the two fixing portions are formed at the second connection member 120.

However, the two fixing portions 113 may be configured in different shapes depending on how the fixing portions are mounted to the catching portions. Specifically, referring to FIG. 2, the part of the fixing portion 113 located on the left side of the figure that is caught by the catching portion 124 so as to be fixed thereto is small, and therefore the catching portion forming the coupling pair therewith is configured in a structure having a recess formed therein. On the other hand, the fixing portion 113 located at the upper part of the figure is configured to be coupled to one surface of the plate 122 while wrapping the same, and therefore the catching portion 124 formed at the plate 122 is configured in a structure having a step formed therein.

FIG. 3 is a perspective view showing the process in which the connection member of FIG. 2 is coupled to a battery cell stack, and FIG. 4 is a perspective view showing the state in which the connection member of FIG. 3 is coupled to electrode leads.

Referring to FIGS. 3 and 4, there is shown a battery cell stack having electrical connection performed by the connection member of FIG. 2. In the battery cell stack, coupling surfaces of electrode leads 102 of two battery cells 101 are arranged in tight contact in the state of being disposed so as to face each other. In FIGS. 3 to 8, however, battery cells are shown as having spaces defined therebetween for convenience of understanding.

The coupling surfaces of the electrode leads 102 are brought into tight contact with each other by fastening of the connection member to form an electrode lead bundle 109.

The outermost electrode leads of the electrode lead bundle 109 are brought into tight contact with the bus bar 111 of the first connection member 110 and the bus bar 121 of the second connection member 120, respectively, whereby electric connection between the battery cells is performed.

The electrode leads 102 are in an unbent state before the connection member is coupled thereto. When the connection members move so as to be close to each other and fastened to each other, however, the electrode leads move in a direction toward the coupling surfaces thereof at the center therebetween and are arranged in tight contact with each other, whereby it is possible to solve the conventional problem in which the electrode leads are perpendicularly bent such that the electrode leads are attached to the bus bar, whereby the electrode leads are mechanically damaged.

FIG. 5 is a perspective view showing the state in which a connection member according to a second embodiment is connected to a battery cell stack.

Referring to FIG. 5, the battery cell stack is constituted by two battery cells 101, and the connection member, which includes a first connection member 210 and a second connection member 220, is added to outer surfaces of two electrode leads 202, whereby coupling therebetween is performed. Electrical connection between the battery cells is performed while the electrode leads 202 form an electrode lead bundle 209.

When comparing the connection member of FIG. 5 with the connection member of FIGS. 2 to 4, there is a difference in positions of a pair of a fixing portion and a catching portion. In the figure, a pair of a fixing portion 213 and a catching portion 224 is disposed at each of the upper surface and the lower surface of the electrode lead bundle.

In the case in which the connection member having the structure described above is used, an electric connection portion configured to perform connection with another battery cell stack may be formed at ends of the electrode leads in the protruding direction thereof.

FIG. 6 is a perspective view showing the state in which a connection member according to a third embodiment is connected to a battery cell stack.

Referring to FIG. 6, the battery cell stack of FIG. 6 is similar to the battery cell stack of FIG. 5; however, there is a difference in that a fixing portion and a catching portion are formed at each of a first connection member 310 and a second connection member 320.

The fixing portion 313 of the first connection member 310 is fastened to the catching portion 324 of the second connection member 320, and the fixing portion 323 of the second connection member 320 is fastened to the catching portion 314 of the first connection member 310, whereby electrical connection between electrode leads 303 is performed while coupling surfaces of the electrode leads are brought into tight contact to form an electrode lead bundle 309.

FIG. 7 is a perspective view showing the state in which a connection member according to a fourth embodiment is connected to a battery cell stack.

Referring to FIG. 7, the battery cell stack includes four battery cells 101, and electrical connection between the four battery cells 101 is performed using the connection member.

Unlike this, it is a matter of course that electrical connection between more than four battery cells may be performed by the connection member.

The connection member is identical to the connection member according to the third embodiment of FIG. 6 in positions at which fixing portions 413 and 423 and a catching portion 424 are formed; however, there is a difference in that the lengths of the fixing portions 413 and 423 are increased.

That is, the fixing portion 413 of a first connection member 410 is fastened to the catching portion 424 of a second connection member 420, and the fixing portion 423 of the second connection member 420 is fastened to a catching portion (not shown) of the first connection member 410, whereby electrical connection between electrode leads 102 is performed while the electrode leads are arranged in tight contact to form an electrode lead bundle 109.

FIG. 8 is a plan view showing the state in which two battery cell stacks, one of which is shown in FIG. 7, are connected to each other.

Referring to FIG. 8, the battery cell stacks include a first battery cell stack 100 and a second battery cell stack 200, the first battery cell stack 100 includes an electrode lead bundle 109 constituted by four electrode leads 102 extending from four battery cells 101, and the second battery cell stack 200 includes an electrode lead bundle 109' constituted by four electrode leads 102 extending from four battery cells 101.

The first battery cell stack 100 and the second battery cell stack 200 are disposed so as to face each other in the state in which the electrode lead bundle 109 and the electrode lead bundle 109' are located adjacent to each other. Coupling surfaces of the electrode lead bundle 109 of the first battery cell stack 100 and the electrode lead bundle 109' of the second battery cell stack 200 are coupled to each other in tight contact by a first connection member 510 and a second connection member 520.

In a concrete example, at least a part of the fixing portion may be made of an elastic material.

For example, the remainder of the fixing portion excluding the portion configured to be fastened to the catching portion is made of a polymer material that exhibits elasticity or a rubber material, the fixing portion may be fastened to the catching portion in a stretched state, and subsequently the fixing portion is contracted due to elastic force thereof, whereby the electrode leads may be fixed to each other in tighter contact.

Alternatively, an elastic material may be applied to at least a part of the plate. In the case in which the catching portion, which is a part of the plate, is made of an elastic material, the catching portion may be pressed so as to be contracted when the fixing portion is fastened to the catching portion, whereby the fixing portion is easily fastened to the catching portion, and subsequently when the pressed state of the catching portion is released, the catching portion is restored to the state before the catching portion is pressed due to elastic force thereof, whereby it is possible to stably maintain the fastened state of the fixing portion.

In addition, an elastic material may be applied to a part of the fixing portion and a part of the plate, whereby it is possible to simultaneously obtain the effect of stably fixing the electrode leads and the effect of stably fastening the fixing portion.

Meanwhile, as the case in which the connection member according to the present invention is used, in the case in which connection between a battery cell stack having electrical connection performed using the connection member and an electrode lead of another battery cell or a bus bar of another battery cell stack is necessary, the electrode lead of the other battery cell or the bus bar of the other battery cell stack may be interposed between the first connection member and/or the second connection member and the outermost electrode lead of the electrode lead bundle.

In the case in which the connection member according to the present invention is used, as described above, it is possible to perform electrical connection between electrode leads of a plurality of battery cells and bus bars in the state in which the electrode leads are not excessively bent. In addition, since no welding is used, it is possible to prevent damage to the electrode leads in a bending process for welding and in a welding process.

Those skilled in the art to which the present invention pertains will appreciate that various applications and modifications are possible within the category of the present invention based on the above description.

DESCRIPTION OF REFERENCE NUMERALS 10, 101: Battery cells
11, 102, 202, 303: Electrode leads
20, 111, 121: Bus bars
100: First battery cell stack
109, 109', 209, 309: Electrode lead bundles
110, 210, 310, 410, 510: First connection members
112, 122: Plates
113, 213, 313, 323, 413, 423: Fixing portions
120, 220, 320, 420, 520: Second connection members
124, 224, 314, 324, 424: Catching portions
200: Second battery cell stack

INDUSTRIAL APPLICABILITY

As is apparent from the above description, in the case in which a connection member according to the present invention is used, it is not necessary to excessively bend electrode leads in a process of coupling the electrode leads to bus bars, whereby it is possible to prevent damage to the electrode leads due to mechanical deformation thereof.

In addition, a welding process performed to couple the electrode leads to the bus bars is omitted, whereby there is no concern of the electrode lead being damaged by welding heat.

The invention claimed is:

1. A connection member configured to couple an electrical connection between electrode leads, the connection member comprising:
a first connection member; and
a second connection member,
wherein the first connection member has a fixing portion coupling the first connection member and the second connection member together, thereby establishing a clamping connection therebetween, and the second connection member has a catching portion receiving the fixing portion fastened thereto,
wherein coupling surfaces of the electrode leads of the battery cells are in direct surface contact with each other, and the coupling surfaces of the electrode leads are coupled with each other by fastening of the connection member around the electrode leads,
wherein the fixing portion and the catching portion are a first fixing portion and a first catching portion that constitute a first coupling pair, the connection member further comprising a second coupling pair including a second fixing portion and a second catching portion configured to receive the second fixing portion fastened thereto, and
wherein each of the first connection member and the second connection member comprises a bus bar configured to electrically connect with the electrode leads and a plate attached to the respective bus bar, the fixing portion extends from the plate of the first connection member, and the catching portion is formed in the plate of the second connection member.

2. The connection member according to claim 1, wherein each of the plates is made of an insulating material.

3. The connection member according to claim 1, wherein the second fixing portion extends from the first connection member and the second catching portion is formed in the second connection member, or the second fixing portion extends from the second connection member, and the second catching portion is formed in the first connection member.

4. The connection member according to claim 1, wherein at least a part of the fixing portion is made of an elastic material.

5. The connection member according to claim 1, wherein at least a part of the plate of each of the first and second connection members is made of an elastic material.

6. A battery cell stack having the electrical connection between the electrode leads coupled by the connection member according to claim 1, wherein
the battery cell stack includes two or more battery cells each having a respective one of the electrode leads extending therefrom, and
the battery cells are arranged in tight contact in a state in which coupling surfaces of the electrode leads of the battery cells face each other.

7. The battery cell stack according to claim 6, wherein the electrode leads together comprise an electrode lead bundle, and outermost ones of the electrode leads of the electrode lead bundle are coupled in tight contact with and electrically connected to the bus bar of the first connection member and the bus bar of the second connection member, respectively.

8. The battery cell stack according to claim 6, wherein
the battery cell stack has a first battery cell stack and a second battery cell stack therein,
the electrode leads of the battery cells of the first battery cell stack together comprise a first electrode lead bundle,
the electrode leads of the battery cells of the second battery cell stack together comprise a second electrode lead bundle,
the first battery cell stack and the second battery cell stack face each other in a state in which the first electrode lead bundle and the second electrode lead bundle are located adjacent to each other, and
coupling surfaces of the first electrode lead bundle of the first battery cell stack and the second electrode lead bundle of the second battery cell stack are coupled in tight contact with each other by fastening of the connection member around both of the first electrode lead bundle and the second electrode lead bundle.

9. A battery pack comprising the battery cell stack according to claim 6.

10. A connection member configured to couple an electrical connection between electrode leads, the connection member comprising:
- a first connection member; and
- a second connection member,
- wherein the first connection member has a fixing portion coupling the first connection member and the second connection member together, thereby establishing a clamping connection therebetween, and the second connection member has a catching portion receiving the fixing portion fastened thereto,
- wherein coupling surfaces of the electrode leads of the battery cells are in direct surface contact with each other, and the coupling surfaces of the electrode leads are coupled with each other by fastening of the connection member around the electrode leads,
- wherein the fixing portion and the catching portion are a first fixing portion and a first catching portion that constitute a first coupling pair, the connection member further comprising a second coupling pair including a second fixing portion and a second catching portion configured to receive the second fixing portion fastened thereto, and
- wherein the second fixing portion extends from the first connection member, and the second catching portion is formed in the second connection member, or the second fixing portion extends from the second connection member and the second catching portion is formed in the first connection member.

* * * * *